United States Patent [19]

Berg

[11] Patent Number: 4,536,440
[45] Date of Patent: Aug. 20, 1985

[54] MOLDED FIBROUS FILTRATION PRODUCTS

[75] Inventor: Harvey J. Berg, St. Paul, Minn.

[73] Assignee: Minnesota Mining and Manufacturing Company, St. Paul, Minn.

[21] Appl. No.: 593,937

[22] Filed: Mar. 27, 1984

[51] Int. Cl.$^3$ .............................................. B32B 5/06
[52] U.S. Cl. ..................................... 428/284; 55/487;
55/524; 55/528; 264/104; 264/123; 264/248;
428/287; 428/296; 428/298; 428/299; 428/360;
428/373; 428/903
[58] Field of Search ......................... 55/524, 528, 487;
264/109, 123, 248; 428/284, 286, 287, 288, 296,
298, 299, 903, 360, 373

[56] References Cited

U.S. PATENT DOCUMENTS 3,333,585  8/1967  Barghini et al. ..................... 128/212
4,195,112  3/1980  Sheard et al. ....................... 428/288

FOREIGN PATENT DOCUMENTS 728462   2/1966  Canada .
2014059  9/1982  United Kingdom .

Primary Examiner—James J. Bell
Attorney, Agent, or Firm—Donald M. Sell; James A. Smith; Roger R. Tamte

[57] ABSTRACT

Molded filtration products, such as disposable face masks, are prepared by assembling at least one fibrous shaping layer and one fibrous filtration layer in face-to-face contact and subjecting the assembly to heat and molding pressure. Preferably the assembly comprises two shaping layers, one on each side of the filtration layer. The shaping layers in total weight no more than about 150 pounds per ream and contribute no more than about 20 percent of the total pressure drop through the filtration product. At least one of the shaping layers comprises fibers that can be bound together at points of fiber intersections by coalescence of binder material on the fibers.

15 Claims, 3 Drawing Figures

MOLDED FIBROUS FILTRATION PRODUCTS

BACKGROUND OF THE INVENTION

Disposable face masks or respirators have previously been made by combining a layer of fibrous filtration media with a preformed fibrous shell. The latter establishes and maintains the shape of the face mask; the filtration media conforms to the shell and is supported and protected by it.

The combination of a filtration layer with a preformed shell, whether done manually or by machine, is time consuming and adds complication to the manufacturing operation. In addition, the filtration layer is sometimes creased, stretched, or folded during the assembly operation, which typically causes deterioration of the filtration properties of the layer.

SUMMARY OF THE INVENTION

The present invention provides new molded fibrous filtration products, and new processes for making such products, which overcome deficiencies in previous products and processes. In brief summary, a new molded filtration product of the invention comprises two or more fibrous layers which have been subjected to heat and molding pressure while assembled in layer-to-layer contact with one another. One or more of the layers are shaping layers that in total have a basis weight up to about 150 pounds per ream and contribute no more than about 20 percent of the pressure drop through the finished filtration product. At least one of the shaping layers comprises fibers bound together at points of fiber intersection by coalescence of binder material on the fibers. Also, any "upstream" shaping layer (i.e., a shaping layer which is impinged upon by a stream being filtered before subsequent layers) has a basis weight no greater than about 50 pounds per ream. Besides the shaping layer or layers, a filtration product of the invention includes a fibrous filtration layer which removes particulates from a gaseous stream passed through the filtration product in a higher percentage than the shaping layer removes them. The filtration layer is attached to the shaping layer or layers by at least fiber entanglement, and is conformed into contact with the shaping layer over the full interface between the layers.

As noted, the several recited layers are subjected to the molding operation while assembled in face-to-face contact. Preferably the shaping layers are in a lofty at least partially unbonded form at the start of the molding operation, and thus cushion the filtration layer during the molding operation. Although the filtration layer would tend to be stretched or torn if subjected to a molding operation by itself, the filtration layer is maintained intact during the layer-to-layer molding operation, and there is minimal folding over of the layer. No significant reduction in filtration properties occurs during the molding operation, and the finished product exhibits uniform filtration properties over the full filtration area of the product. Not only are good properties obtained, but the operation is direct and simple, with a finished filtration product being obtained directly from the basic fibrous layers in one step except for possible trimming of excess materials.

DETAILED DESCRIPTION

Figure 1:
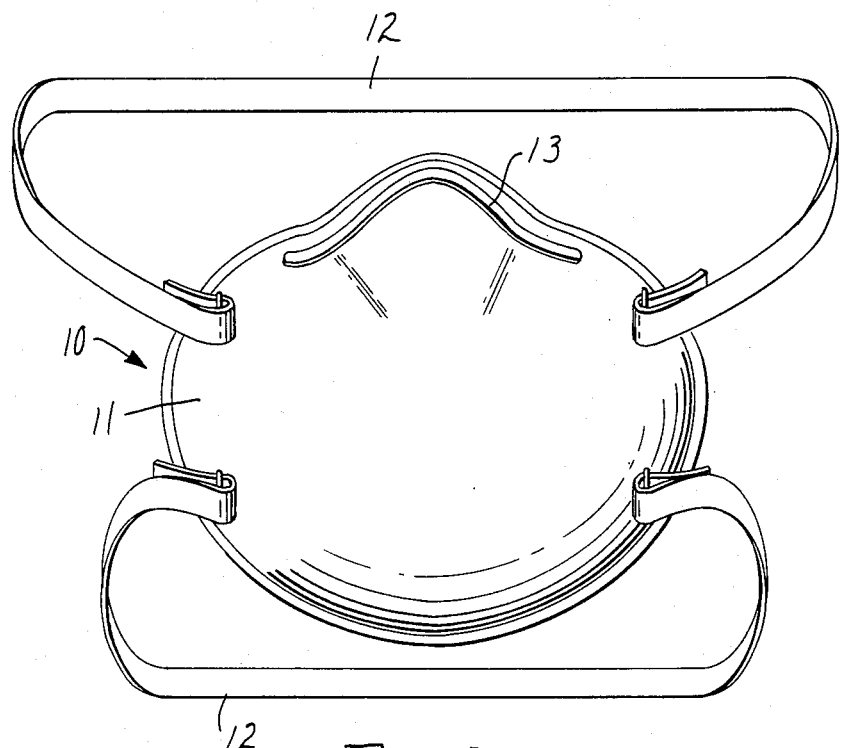
FIG. 1 is a front view of an illustrative finished face mask or respirator of the invention.
Figure 2:
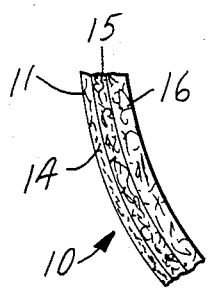
FIG. 2 is a sectional view through a portion of the face mask shown in FIG. 1.

An illustrative face mask or respirator of the invention 10 is shown in FIGS. 1 and 2 and comprises a mask body 11, elastic head bands 12 which are stapled or otherwise attached to the mask body for holding the mask over a human face, and a pliable dead-soft band 13 of a metal such as aluminum by which the nose portion of the mask can be shaped and held in a desired fitting relationship with the nose of the wearer. The mask body 11 has a cup shape so that it stands out in spaced relation from normal human faces and makes a snug low-pressure contact over the bridge of the nose, across the cheeks, and under the chin. The body is sufficiently stiff to retain its shape and avoid collapse during inhalation but is flexible and resilient so as to be comfortable.

As shown in FIG. 2, the mask body 11 preferably comprises three layers, a first (upstream) shaping layer 14, a filtration layer 15, and a second shaping layer 16. Although the term "shaping layer" is used in this description, the shaping layers also have other functions, which in the case of the outermost layer may even be a primary function, such as protection of the filtration layer and prefiltration of a gaseous stream. Also, although the term "layer" is used, one layer may in fact comprise several sublayers, assembled to obtain desired thickness or weight. In some embodiments only one, generally inner, shaping layer is included in a mask of the invention, but shaping is accomplished more durably and conveniently when two shaping layers are used, one on each side of the filtration layer.

At least one of the shaping layers comprises fibers that carry a binder material by which the fibers can be bonded to one another at points of fiber intersection, e.g., by heating the layer so that the binder materials on adjacent fibers coalesce. One useful fiber of this type is a bicomponent fiber that comprises a core of crystalline polyethylene terephthalate (PET) surrounded by a sheath of a polymer formed from isophthalate and terephthalate ester monomers. The latter polymer is heat-softenable at a temperature lower than the core material. In a different embodiment the shaping layer comprises PET staple fibers coated with a thermosetting resin, e.g., by roll-coating a thin layer of the fibers, reopening the layer and then reforming the layer on air-laying equipment.

In molding a mask body of the invention, a filtration layer is assembled with at least one shaping layer, and the assembly subjected to a molding operation, e.g., by placing the assembled layers between male and female mold parts and heating the assembly. The shaping layer or layers assembled with the filtration layer are preferably dry fluffy webs, such as prepared on air-laying equipment, having a loft of 5 millimeters or more prior to the molding operation. As noted above, such a lofty shaping layer appears to provide additional cushioning for the filtration layer during the molding operation, tending to protect the filtration layer from rupture or folding. Also, the shaping layer may provide heat insulation for the filtration layer, which further maintains the desired fibrous and porous structure of the filtration layer. The shaping layer is compacted during the molding operation, but also maintains a porous and fibrous structure. The temperatures and pressures are selected to preserve the fibrous nature of the layer, e.g., by choosing temperatures above the softening point of one component of bicomponent fibers. The filtration layer becomes attached to the shaping layer or layers, at least by entanglement of fibers at the interface between the layers, and usually also by some binding of fibers of the shaping layers to the filtration layer.

The shaping layer is typically not a primary filtering layer in a filtration product of the invention, though it may serve some prefiltering or coarse filtering action. It should be sufficiently porous so as to contribute only a minor portion of the pressure drop through the filtration product. As noted above, the shaping layer or outer and inner shaping layers in combination contribute no more than about 20% of the pressure drop through a face mask or other filtration product of the invention. Correspondingly, the shaping layer or layers are of low weight, i.e., having a basis weight of 150 pounds per ream or less, and preferably 100 pounds or less. By making the weight of the outermost, or upstream, layer no more than 50 pounds, the layer better avoids a caking of filtered particulate that severely increases pressure drop. Generally the shaping layers in total weigh at least 40 pounds per ream.

Typically the filtration layer comprises fibers that do not become bonded together during the molding operation. The particular fibers of the filtration layer are selected depending upon the kind of particulate to be filtered. Webs of melt-blown fibers, such as taught in Wente, Van A., "Superfine Thermoplastic Fibers" in *Industrial Engineering Chemistry*, Vol. 48, 1342 et seq (1956), especially when in a persistent electrically charged form (see Kubik et al, U.S. Pat. No. 4,215,682), are especially useful. Preferably these melt-blown fibers are microfibers having an average diameter less than about 10 micrometers in diameter. Electrically charged fibrillated-film fibers as taught in van Turnhout, U.S. Pat. No. Re. 31,285, are also especially useful. Rosin-wool fibrous webs and webs of glass fibers are also useful. Surprisingly, it has been found that the important filtration parameters of the filtration layers, such as precent penetration of particulate matter and pressure drop are not greatly altered during the molding operation.

Figure 3:
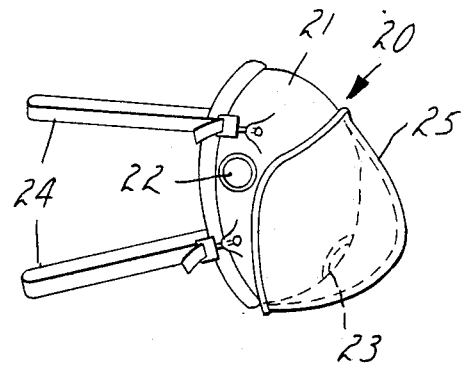
FIG. 3 is a perspective view of a different illustrative filter product of the invention attached to a face mask.

FIG. 3 shows another illustrative respirator or mask 20 of the invention. In this embodiment the illustrated mask 20 comprises a molded face piece 21 which includes an exhalation valve 22 and inhalation valve 23 and headbands 24. A removable cup-shaped filter body 25, which comprises an assembly of at least one shaping layer and filtration layer as described above, is attached to the face piece.

For other filter devices a filtration product of the invention may take other shapes besides the cup shape illustrated in FIGS. 1-3. For example, a filtration product of the invention may be molded with corrugations that increase the bending strength of the product. Filtration products of the invention may take the form of cartridges adapted to be received in a receptacle in a filter device.

The invention will be further illustrated by the following examples.

EXAMPLE 1

A filtration layer weighing 30 pounds per ream (320 square yards) was prepared as a web of electrically charged melt-blown polypropylene microfibers having an average diameter of 7 micrometers. This web was laid between two shaping layers, each of which was a dry, fluffy, air-laid fibrous web comprising four-denier-per-filament staple bicomponent fibers about 50 millimeters in length. The fibers (available as "Melty Fiber Type 4080" from Unitika Limited, Osaka, Japan) comprised a core of polyethylene terephthalate having a melting temperature of approximately 245° C., and a sheath comprising a copolymer of ethylene terephthlate and ethylene isophthalate. The bottom or inner shaping layer weighed 45 pounds per ream and the top or outer layer weighed 25 pounds per ream.

A face mask was then molded from the above three-layer assembly by first placing a 10-inch by 10-inch square portion of the assembly over a heated, rigid, cup-shaped silicone male mold heated to a temperature of about 120° C., which was within the thermosoftening range of the polymeric sheath of the bicomponent fibers of the shaping layers. The assembly was promptly subjected to uniform pressing with a "Teflon"-coated aluminum female mold having a contour complementary to the male mold and heated to the same temperature. The mask-forming portions of the mold parts were separated by approximately 0.060 inch during the molding operation. The projected area of the mold was about 35.75 square inches and a pressure of about 215 pounds was applied for about 6-10 seconds. After immediate separation of the mold parts, a compacted and unified molded mask body was removed which precisely conformed to the mold shape and retained that shape.

Four such mask bodies were prepared and tested according to the test standard for dusts and mists described in 30 Code of Federal Regulations, Section 11.140-5. Penetration of silica dust through the mask bodies was measured on a breathing machine and averaged 1.4 milligrams and the final exhalation pressure drop averaged 9.4 millimeters of water, which satisfies the specifications established in the test standard.

EXAMPLE 2

A dry fluffy fibrous web having a basis weight of 88 pounds per ream was made on a "Rando Webber" air-laying machine from 6-denier-per-filament, 2-inch-long, crimped, semi-dull, PET staple fibers, Type 476, Finish 75 (Celanese Fiber Industries, Inc. Salisburg, N.C.). A 25% solids solution in methyl ethyl ketone and toluene of amorphous non-crystallizable copolyester (Vitel PE-200, manufactured by Goodyear) was squeeze-roll-coated onto the polyester web. After drying, the web was reweighed and it was found that 32 pounds per ream of the amorphous copolyester had been deposited on the fibers of the web.

The coated web, which was tightly compacted, was re-opened using the "lickerin" portion of the Rando Webber machine and reformed into a dry, fluffy, fibrous web having a basis weight of 33 pounds per ream. The weight ratio of amorphous polyester to PET staple fiber was 36:100.

A layer weighing 30 pounds per ream of polypropylene melt-blown electrically charged polypropylene fibers averaging 7 micrometers in diameter was sandwiched between four layers of the previously mentioned fluffy web—2 layers on top and 2 layers on the bottom. This assembly was then molded in a manner similar to Example 1 for 8-10 seconds to form a mask body.

Upon testing by the test standard cited in Example 1, the prepared mask bodies passed the standard, with the silica dust penetration through the mask bodies averaging 1.69 milligrams, and the final exhalation pressure drop averaging 9.1 millimeters of water.

EXAMPLE 3

Example 1 was repeated except that the filtration layer in the example was a layer of electrically charged fibrillated-film polypropylene fibers as described in van Turnhout, U.S. Pat. No. Re. 31,285, weighing 300 grams per square meter (175 pounds per ream).

The prepared mask bodies passed the cited test standard for dust and mists, with penetration of silica dust through the mask body averaging 0.16 milligrams and the final exhalation pressure drop averaging 6.7 millimeters of water.

EXAMPLE 4

Example 1 was repeated except that a single shaping layer was used, on only the inner, or downstream, side of the filtration layer. The fibers of the shaping layer were the same as in Example 1, and the shaping layer weighed 60 pounds per ream. During molding, the shaping layer side of the assembly was placed against the silicone male mold.

The prepared mask bodies passed the cited test standard for dusts and mists, with penetration of silica dust through the mask body averaging 1.2 milligrams, and the final exhalation pressure drop averaging 7.4 millimeters of water.

What is claimed is:

1. A molded filtration product comprising at least two fibrous layers which have been subjected to heat and molding pressure while assembled in face-to-face contact with one another, one or more of the layers being a shaping layer that (a) in total have a basis weight no greater than 150 pounds per ream, (b) in total contribute no more than about 20 percent of the pressure drop through the finished filtration product, and (c) at least one of which comprises fibers bound together at points of fiber intersection by coalescence of binder material on the fibers; and another of the layers being a fibrous filtration layer which removes particulates from a gaseous stream passed through the filtration product in a higher percentage than the shaping layer removes them; any shaping layer upstream of the filtration layer having a basis weight of no greater than about 50 pounds per ream; the filtration layer being attached to the shaping layer or layers by at least fiber entanglement, and being conformed into contact with the shaping layer or layers over the full interface between the layers.

2. A molded filtration product of claim 1 in which the filtration layer comprises melt-blown fibers having an average diameter of no more than about 10 micrometers.

3. A molded filtration product of claim 2 in which said melt-blown fibers carry a persistent electric charge.

4. A molded filtration product of claim 1 in which the filtration layer comprises fibrillated-film fibers.

5. A molded filtration product of claim 1 in which the shaping layer comprises bicomponent fibers, one component of which is said binder material.

6. A filtration product of claim 1 which exhibits a pressure drop of no greater than about 30 millimeters of water at a face velocity of 85 liters per minute.

7. A filtration product of claim 1 which includes two shaping layers, one disposed on each side of the filtration layer.

8. A molded filtration product of claim 7 in which the fibers of the second shaping layer are bound together at points of fiber intersection by coalescence of binder material on the fibers.

9. A molded filtration product which exhibits a pressure drop of no more than about 30 millimeters of water at a face velocity of 85 liters per minute, comprising at least three fibrous layers which have been subjected to heat and molding pressure while assembled in layer-to-layer contact with one another, two of the layers being shaping layers that are disposed on each side of another fibrous layer that serves as a filtration layer, (b) in total have a basis weight between about 40 and 150 pounds per ream, (c) in total contribute no more than about 20 percent of the pressure drop through the finished filtration product, and (d) comprise bicomponent fibers bound together at points of fiber intersection by coalescence of binder material carried as one component on the fibers, the shaping layer upstream of the filtration layer having a basis weight of no greater than about 50 pounds per ream; the filtration layer removing particulates from a gaseous stream passed through the filtration product in a higher percentage than the shaping layers remove them, and the filtration layer being attached to the shaping layers by at least fiber entanglement, and being conformed into contact with the shaping layers over the full interface between the layers.

10. A molded filtration product of claim 9 in which the filtration layer comprises melt-blown fibers having an average diameter of no more than about 10 micrometers.

11. A molded filtration product of claim 10 in which said melt-blown fibers carry a persistent electric charge.

12. A molded filtration product of claim 9 in which the filtration layer comprises fibrillated-film fibers.

13. A method for preparing a molded filtration product comprising
    (a) assembling in face-to-face contact at least two fibrous layers, one or more of the layers being a shaping layer that (a) in total have a basis weight no greater than 150 pounds per ream, (b) in total have a loft of at least 5 millimeters, and (c) at least one of which comprise fibers that can be bound together at points of fiber intersection by coalescence of binder material on the fibers, and another of the layers being a fibrous filtration layer which removes particulates from a gaseous stream passed through the filtration product in a higher percentage than the shaping layer removes them; and
    (b) subjecting the assembly to heat and pressure sufficient to mold the assembly to a non-flat shape whereupon a molded filtration product is formed in which the fibers of at least one of the shaping layers are bonded together by coalescence of binder material on the fibers, the shaping layers in total contribute no more than 20 percent of the pressure drop through the finished filtration product, and the filtration layer is attached to the shaping layer or layers by at least fiber entanglement, and is conformed into contact with the shaping layer or layers over the full interface between the layers.

14. A method of claim 13 in which there are two shaping layers, one on each side of the filtration layer and each of which have an initial loft of at least 5 millimeters.

15. A method of claim 13 in which said at least one shaping layer comprises bicomponent fibers, one component of which is said binder material.

* * * * *